(No Model.) 7 Sheets—Sheet 1.

G. HAYES.
MACHINE FOR MANUFACTURE OF SHEET METAL LATHING.

No. 547,952. Patented Oct. 15, 1895.

Fig. 1.

Witnesses.
Arthur Hayes
R. H. Reille

Inventor.
Geo Hayes (No Model.) 7 Sheets—Sheet 2.

G. HAYES.
MACHINE FOR MANUFACTURE OF SHEET METAL LATHING.

No. 547,952. Patented Oct. 15, 1895.

Witnesses. Inventor.

(No Model.) 7 Sheets—Sheet 3.

G. HAYES.
MACHINE FOR MANUFACTURE OF SHEET METAL LATHING.

No. 547,952. Patented Oct. 15, 1895.

Witnesses.
Arthur Hayes
R. H. Reille

Inventor.
Geo Hayes (No Model.) 7 Sheets—Sheet 4.

G. HAYES.
MACHINE FOR MANUFACTURE OF SHEET METAL LATHING.

No. 547,952. Patented Oct. 15, 1895.

(No Model.) 7 Sheets—Sheet 5.
G. HAYES.
MACHINE FOR MANUFACTURE OF SHEET METAL LATHING.
No. 547,952. Patented Oct. 15, 1895.

Witnesses.
Arthur Hayes
R. T. V. Reille

Inventor.
Geo Hayes (No Model.) 7 Sheets—Sheet 6.
G. HAYES.
MACHINE FOR MANUFACTURE OF SHEET METAL LATHING.

No. 547,952. Patented Oct. 15, 1895.

Witnesses.
Arthur Hayes
R. H. Reilly

Inventor.
Geo Hayes.

(No Model.)  7 Sheets—Sheet 7.

G. HAYES.
MACHINE FOR MANUFACTURE OF SHEET METAL LATHING.

No. 547,952. Patented Oct. 15, 1895.

Witnesses.
Arthur Hayes
R. H. Reille

Inventor.
Geo Hayes

UNITED STATES PATENT OFFICE.

GEORGE HAYES, OF NEW YORK, N. Y.

MACHINE FOR MANUFACTURE OF SHEET-METAL LATHING.

SPECIFICATION forming part of Letters Patent No. 547,952, dated October 15, 1895.

Application filed May 3, 1895. Serial No. 548,062. (No model.) Patented in England January 8, 1894, No. 405, and April 19, 1895, No. 7,844; in Germany April 17, 1895, No. 81,283; in France April 17, 1895, No. 238,002, and in Belgium April 17, 1895, No. 109,661.

*To all whom it may concern:*

Be it known that I, GEORGE HAYES, a citizen of the United States, and a resident of the city, county, and State of New York, have invented a new and useful Machine for the Manufacture of Sheet-Metal Lathing, (certain parts of which have been patented in the following countries, to wit: in Great Britain January 8, 1894, No. 405, and April 19, 1895, No. 7,844; in Germany April 17, 1895, No. 81,283, addition; in France April 17, 1895, No. 238,002, addition, and in Belgium April 17, 1895, No. 109,661, addition,) of which the following is a specification.

My invention consists of a machine specially constructed and adapted for manufacture of sheet-metal lathing, more particularly those lathings which are slitted or otherwise cut through at intervals, are ridged, ribbed, or corrugated without loss of their original area and outline, the corrugations, ridges, or ribs being wholly allowed for by lateral expansion of the slits or openings therein, the apertures therein thus formed serving to afford bond for plaster with or without conjunction of additional apertures or other features.

The invention includes such devices, parts, and combinations of parts which serve to secure the desired results and also a coating and lubricating device or apparatus as a part thereof or used in conjunction therewith, all as hereinafter more fully described and pointed out in the claims, reference being had to the accompanying drawings, in which—

Figs. 4 and 6, are here shown as each composed of rings upon a shaft. Fig. 18½ shows sectionally a piece of similar lathing, the surface between the ridges being flat.

On the drawings, A indicates the framework of the machine, which may be of any suitable pattern and material.

B indicates a table or shelf, upon which the flat sheet-blanks are laid one by one and fed to the machine.

C indicates a table or shelf whereon the finished lathing-sheets are received from the machine.

The machine is provided with a set of two rolls D and E at the front, which perform the operation of slitting the sheet at intervals, and at F and G rearward are provided two rolls as a set, which perform the function of ridging, ribbing, or corrugating the sheet after it has passed the front rolls. A sheet of metal B', as a flat blank, enters between rolls D and E, the arrow indicating its direction of motion through the machine. I form the upper roll D with a shaft D', upon which I place a series of narrow-faced cutting-dies $D^2$ at suitable distances apart, with a separating ring or washer $D^3$ between every two cutting-rings, the dies projecting beyond the washers, and all the rings are keyed to the shaft to turn therewith. The lower roll E, I also preferably form with a shaft E', upon which is placed a series of annular carriers $E^2$, with a separating ring or washer $E^3$ between every two, the carriers projecting so that hollows or annular grooves are formed between the carriers, as matrices, to receive the thrust of the dies $D^2$, and all the rings are keyed to the shaft to turn therewith. As arranged in the machine, the carriers $E^2$ project upward between the cutting-dies $D^2$ and support the sheet of metal, the dies entering and leaving as the rolls revolve and as the sheet passes onward, cutting openings at intervals in longitudinal lines. The rings of both rolls are held closely together upon their respective shafts by nuts threaded upon one end of the shaft and an abutment at the other end or other suitable means. The lower roll E may be of solid metal entire, but surfaced as annular carriers and matrices equivalent to aforesaid rings. The sheet of metal B', continuing onward, reaches next the rear rolls F and G for corrugating, ridging, or ribbing. I preferably construct each of the rear rolls with a shaft with thereupon a series of alternating receding and projecting rings, as annular ridges and hollows, all keyed to their respective shafts to turn therewith, the projecting rings of the one arranged to come between the projecting rings of the other, and all the rings of each shaft secured by a nut threaded on at one end and an abutment at the other. The sheet of metal, passing between the rolls F and G under pressure of the projecting annular ridges as they rotate, is pressed out of the plane of the sheet on designed lines to a configuration of corrugations or ridges and hollows of the desired form, or as ridges and flat surfaces. By varying the shape of the rings or their distances apart or doubling washers the configuration of the sheet may be changed to many desirable patterns. The distances apart of the cutter-rings and carriers to the front rolls may be also varied in like manner to suit and secure modifications in form and position of openings. As the sheet is pressed out of plane into ridges and hollows, the slits or openings therein expand under the strain and become suitable in size and shape to serve as bonds for plaster, and the corrugations are thus wholly allowed for by the lateral expansion of the slits, slots, or openings therein, and no contraction of the sheet in area can occur.

In constructing the cutting-dies $D^2$, when lips or raised edges to loops are desired for the lathing-sheets, I give certain of them a sharp slitting-edge to form the initial cut, and receding therefrom to one side a rounded or other suitable bevel that will cause a turn of the edge metal of such openings outwardly to one face of the sheet, where desired for the purpose. Punching-dies for slotted openings, formed as usual, but in rings, may be substituted for the cutter-dies whenever such openings are desired. All the openings through the sheet metal or certain of them must be arranged to "break joint" with adjacent lines to permit of the expansion as the metal bends out of plane in corrugating.

Figure 1:
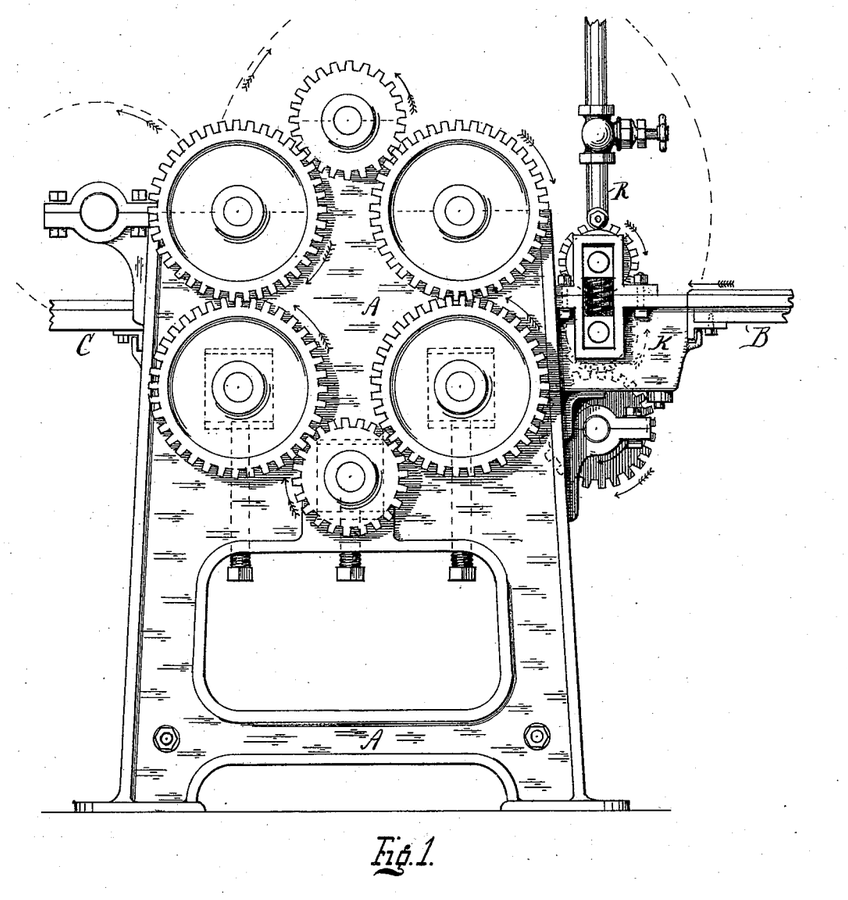
Figure 1 represents a side elevation of the machine, showing exterior gearing and lubricating or coating apparatus.
Figure 2:
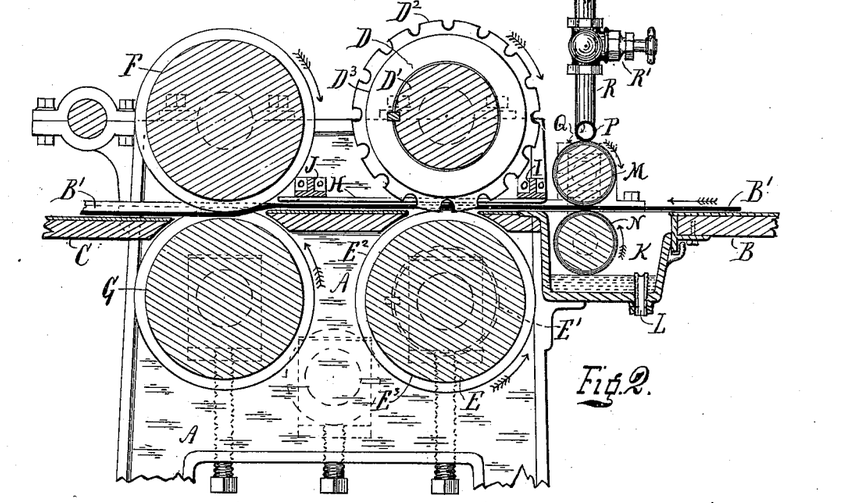
Fig. 2 is a vertical longitudinal section of the machine complete, as in Fig. 1.
Figure 3:
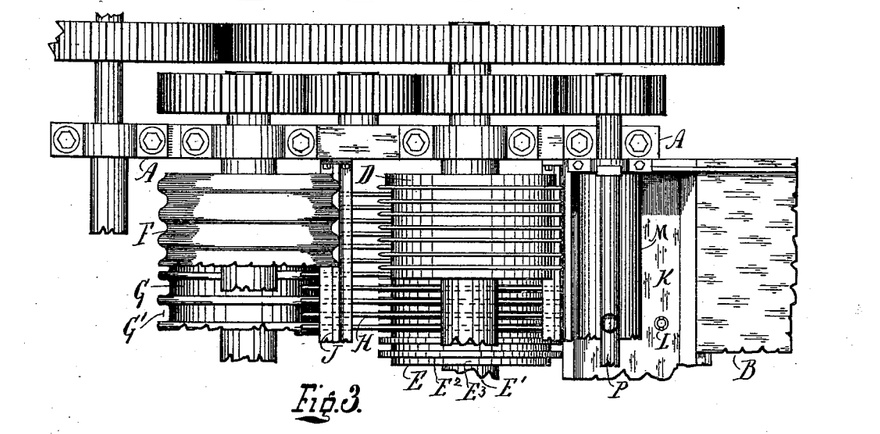
Fig. 3 is a plan or top view of about one-half of the machine with various parts broken away or shortened to expose parts beneath.
Figure 4:
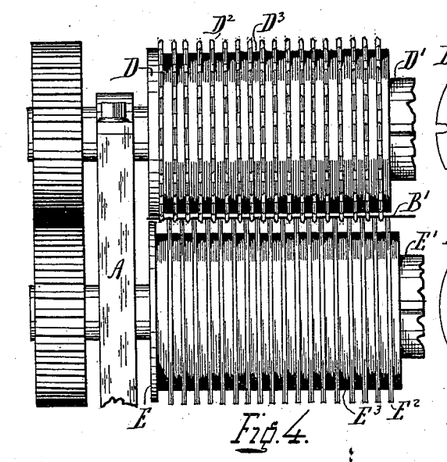
Fig. 4 is a front elevation of about one-half of the length of the first set of rolls, between which in passing the flat sheet-blank is slitted, slotted, punctured, or opened through at intervals in longitudinal lines.
Figure 5:
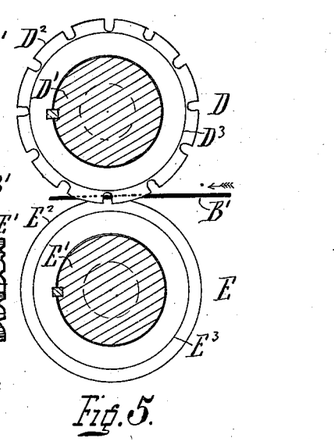
Fig. 5 is a cross-section of the rolls of Fig. 4, with a piece of sheet metal therebetween.
Figure 6:
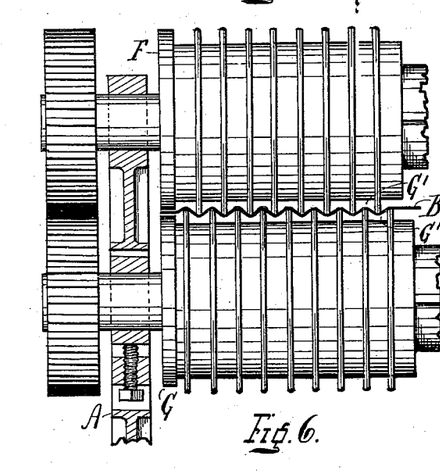
Fig. 6 is a front elevation of about one-half of the second set of rolls, through between which in passing the slitted sheet of metal becomes ridged, ribbed, or corrugated without thinning of the metal or contraction of the width of the sheet, illustrating the simplest form.
Figure 7:
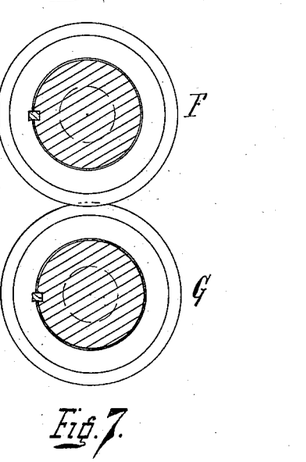
Fig. 7 is a cross-section of the rolls of Fig. 6. The rolls in elevation.
Figures 8, 9, 10, 11:
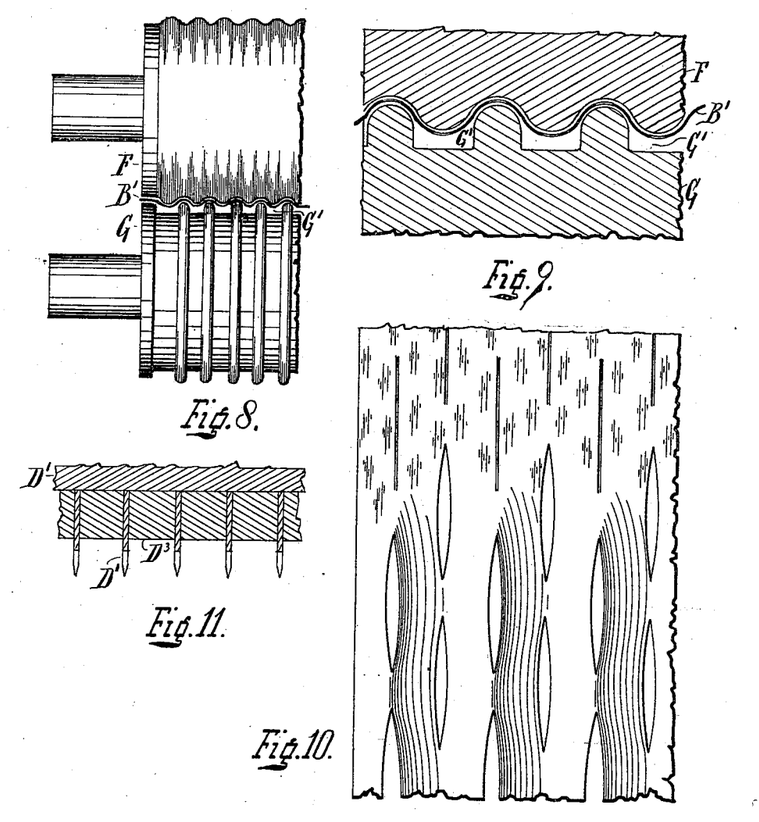
Fig. 8 is an elevation of about one-half of a set of corrugating rolls similar in surface to those of Figs. 4 and 6, but formed of solid metal in one piece entire.
Fig. 9 is a sectional view of a portion of the corrugating-rolls of Fig. 8 enlarged to about full size, with a piece of sheet metal between being corrugated.
Fig. 10 is a view of the piece of sheet metal after having passed through the rolls shown in Fig. 9, illustrating stages of manufacture. The upper part of the figure shows the sheet slitted, but not yet corrugated, and the lower part shows the sheet corrugated, its breadth remaining the same as when previously flat, and the apertures opened or expanded, allowing for the corrugations and affording bond for plaster.
Fig. 11 is a sectional view of a portion of one of the front or cutting rolls, showing the arrangement of cutters used in slitting the sheet shown in Fig. 10.
Figures 12, 13, 14, 15:
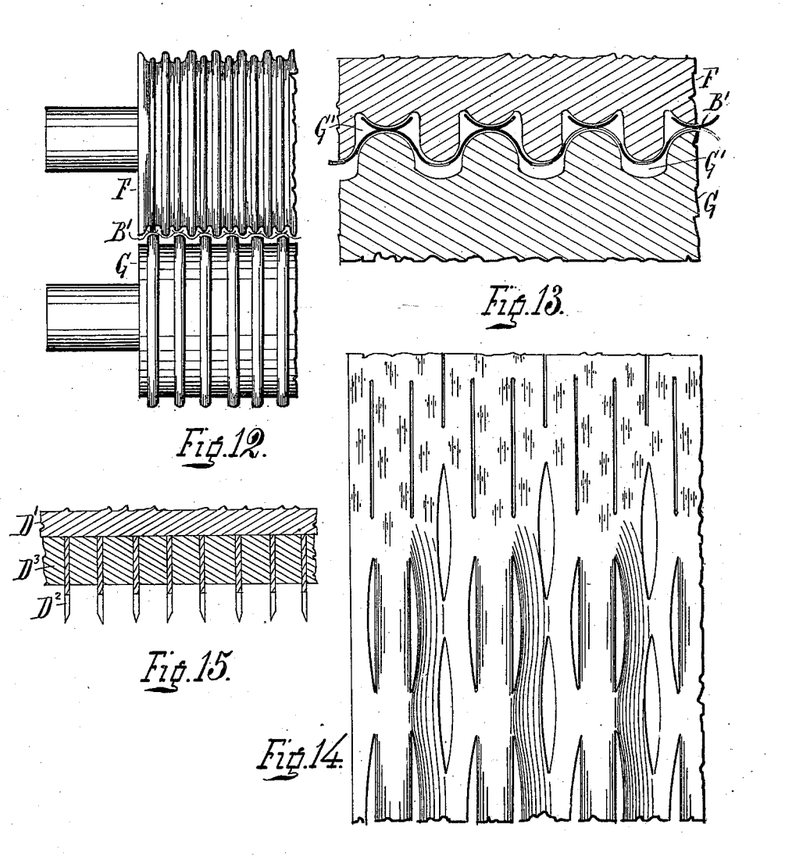
Figs. 12, 13, 14, and 15 comprise a set of views corresponding to those of Figs. 8 to 11, inclusive, illustrating another modification in the lathing-sheet with the cutters and corrugators, as formed and arranged in making it, this sheet having loops with raised edges along each ridge.
Figures 16, 17, 18, 19:
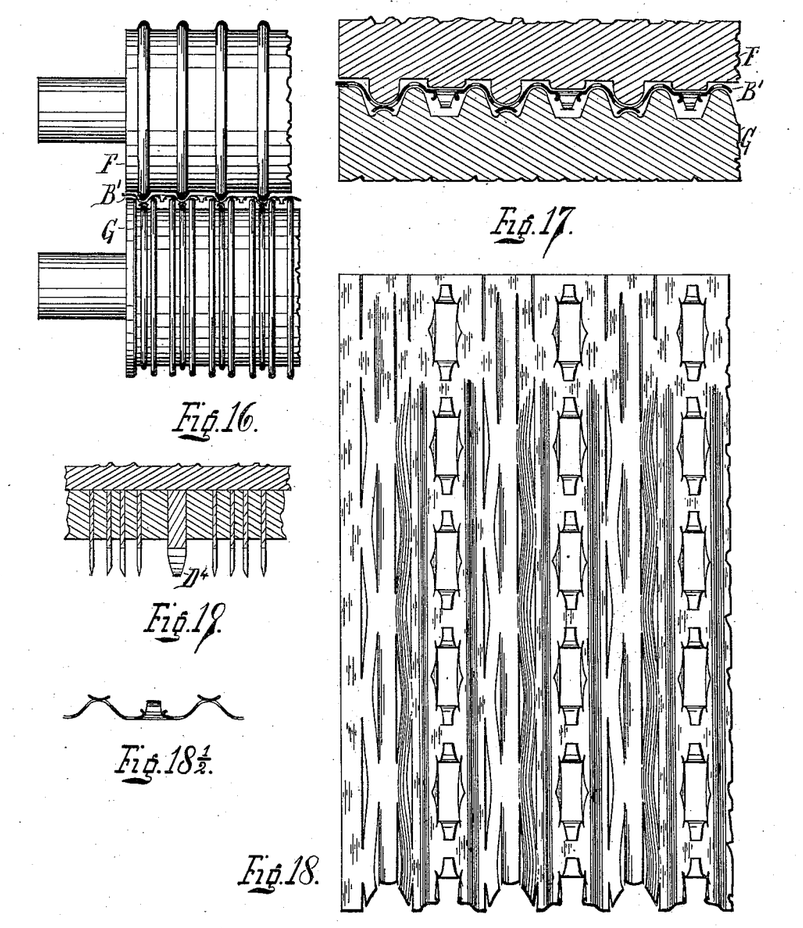
Figs. 16 to 19, inclusive, comprise a set of views corresponding also to those of Figs. 8 to 11, inclusive, illustrating another modification of lathing-sheet with appliances for its construction. In this case the sheet is ribbed at intervals with flat or raised and flat surfaces between the rise of the ribs in the hollows to the main face, and in the flat surface portions another species of apertures are formed by puncturing and turning outwardly edge metal of the cuts to serve as tongues, hooks, or barbs. Such apertures are not expanded.

Although the rolls F and G are preferably formed of rings upon a shaft, they may be lathe-turned in the solid metal, the surface formed in annular ridges and hollows, after the manner shown in Figs. 9, 13, 17, and 22. In either case spaces must be arranged for wherein the sheet-metal web between and about the slits or slots will be free to move, as at G' in Figs. 6 and 9. The rolls therefore do not conform in meeting surfaces throughout, as in corrugating and molding rolls heretofore made, but only touch where it is desirable to apply the pressure in forcing out of plane the sheet metal and hold the sheet from lateral movement in ridging or corrugating. Between such points they do not touch, but leave the metal web free from pressure or grip, so that no contraction of the sheet in width can occur, the corrugations resulting and being derived solely from the expansion of the openings therein. The rolls are all properly geared together to turn in unison and provided with suitable driving mechanism, as usual. They are also adjustably journaled to provide for passage of sheets of varying thickness.

Figures 20, 21, 22, 23, 24:
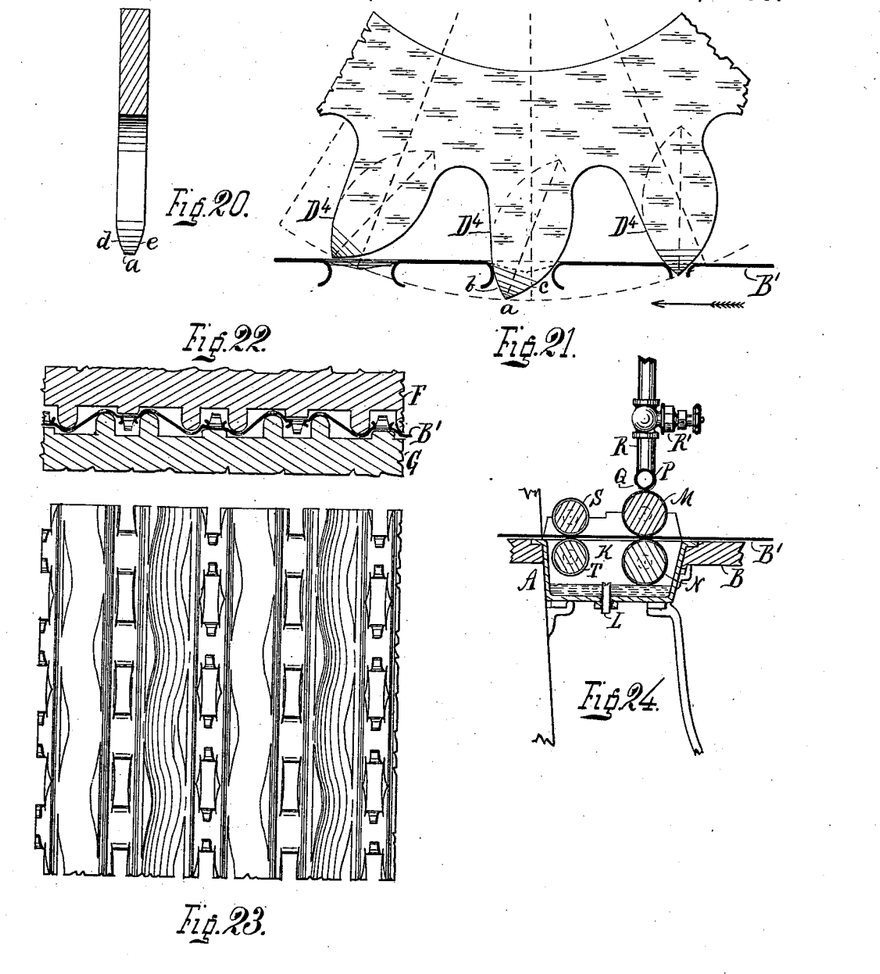
Fig. 20 is a cross-section of the die-ring with edgewise view of the die, by which the tongued openings of Figs. 17, 18, and 18½ are punctured and formed.
Fig. 21 is a side view of a portion of the die-ring of Fig. 20 with piece of metal, showing the operation of the dies thereupon.
Fig. 22 is a sectional view of ridged faces for the corrugating-rolls analogous to those before mentioned, with lathing-sheet therein, illustrating the manner of making a double-faced sheet-lathing having tongued apertures therein, tongues projecting from both faces in alternating lines. In such cases the slitting and puncturing rolls would be brought to correspond.
Fig. 23 shows one face of the lathing of Fig. 22.
Fig. 24 is a sectional view of a lubricating and coating apparatus with drying-rolls added and adapted for combination with the machine proper or for separate use.

Dies for puncturing and forming tongued openings (shown in Figs. 18 and 23) are made as represented in Figs. 20 and 21, being projections of rings which fit upon the shaft of roll D, and sometimes when desired upon roll E between washers where suitable. Such dies are made with the puncturing-edge $a$ and four rounded receding faces $b$, $c$, $d$, and $e$. The point or cutting-edge $a$ is formed forward of the axis-center of the die, as shown in Fig. 21, which makes the curve $c$ longer than curve $b$, which facilitates entering and leaving the sheet metal, while the curved faces turn outwardly the edge metal of the cuts which are made by the sharp angular edges of the die. This form of die renders the end tongues of the opening equal in length, projection, and curve. The die part of the ring is indicated at $D^4$. At H is arranged a stripper of metal rods secured to the under side of a cross-bar I and passing between the cutter-dies nearly to the corrugating-rolls, where the rear ends of the rods are left free. A cross-bar J prevents too far upward movement. The rods lie on top the sheet of metal and serve to keep it level in passage. The rods may be readily adjusted laterally to suit any arrangement of cutter-dies and style of lathing being made. Whenever desired, a lubricating and coating device for facilitating passage of the sheet metal through the machine is added thereto, as shown in Figs. 1, 2, 3, and 24. It will also apply a coating to the sheet, serving to prevent oxidation. The apparatus comprises a basin or trough K, having an adjustable outlet L, as a tube, threaded through the bottom of the basin and inwardly of such length as to suit any desired depth of liquid held by the basin, which, by overflowing at the top of the tube, will escape. In emptying the basin the tube is screwed downward until its top is level with the bottom of the basin. M and N are two rolls of any suitable material in adjustable bearings and faced with some suitable material for applying the liquid, preferably felt. At P is a tube lying closely to the top of the roll M across the machine and provided with a line of perforations or orifices at Q for outlet of liquid therefrom. At R is a vertical tube extending upward from the middle of tube P to any suitable tank, barrel, or reservoir for supply. Tube R is provided with a valve at R′ to regulate and shut off the flow when desired. Another perforated distributing-tube may be added to the machine and located against the lower roll N, so as to be below the inserted sheet of metal and connected at one or both ends with the tube P by a suitable connecting-tube arranged in a slanting direction, so that a supply of liquid may be given to the lower roll, if desired. I employ an oily composition of any suitable ingredients which will flow properly. It facilitates the passage of metal through the machine-rolls and provides a preventive coating against rust. The apparatus, as shown in Fig. 24, is furnished with an additional set of rolls S and T, which may be geared together and to the former, above mentioned. Their use is to further spread the coating, remove superfluities, and facilitate the drying of the liquid upon the sheet metal, as shown in Fig. 24. The apparatus may be used separably from the machine or in combination therewith, as desired. Shear or knife rings with continuous cutting-edge may be inserted at any point desired to rolls D and E by a substitution, so that a full-width sheet will become divided into two or more narrow sheets whenever desirable.

What I claim as new, and desire to secure by Letters Patent, is—

1. A machine containing a set of rolls formed at intervals as annular cutters adapted to slit and puncture a sheet of metal in lines at intervals and also at intervals provided with annular series of puncturing dies adapted to form tongued apertures in the same sheet of metal followed by a set of rolls having surfaces of annular ridges and hollows adapted to form the slitted and punctured sheet of metal at intervals in lines of continuous elevations and depressions wholly allowed for by expansion of the slits therein and adapted to pass through without crushing or deforming tongues of metal projected from apertures punctured in the sheet as set forth.

2. A machine containing a set of two rolls, each formed with a core-shaft having thereupon a facing of alternately projecting and receding rings, the outer edges of certain of the projecting rings to one roll formed as annular series of cutters adapted to slit a sheet of metal at intervals—and certain other projecting rings formed as annular series of puncturing dies adapted to form tongued apertures at intervals in the same sheet as set forth.

3. A machine containing a rotating series of puncturing dies adapted to cut through a sheet of metal at intervals and turn outwardly the edge-metal of the cuts as tongues—each die formed with its entering edge, or point located anglewise to its radial line as set forth.

4. A machine containing a set of two rolls adjustably geared together, the surfaces of each formed with a series of annular ridges and hollows specially shaped and arranged together that spaces are constituted between every two ridges and the two rolls as arranged conjointly, adapted to form a slitted sheet of metal into a series of alternating ridges and hollows with the slits therein expanded laterally allowing wholly for the ridges as set forth.

5. A machine containing a set of two rolls adjustably geared together, the surface of one roll formed with series of annular ridges and hollows at intervals in sets of three each, the other roll having one ridge opposite the middle ridge of every three, the rolls as arranged together providing spaces between every two ridges and also wider spaces between every triplicate set and the two rolls as arranged conjointly adapted to form a slitted sheet of metal into a series of ridges at intervals over the breadth of the sheet, expanding the slits therein allowing wholly for the ridges in the lesser spaces while in the larger spaces allowing the free passage of tongues of metal projected from the sheet without injury thereto as set forth.

6. A machine containing three sets of two rolls each—each two arranged one above the other—the first set having beneath them a drip vat, or basin and above them upon the top of the uppermost a perforated distributing tube connected to a conveying tube provided with regulating valve and leading from any suitable reservoir, whereby a coating of any suitable lubricating liquid can be supplied to the rolls and thence to a sheet of metal passing between them, the second set of rolls formed as annular cutters adapted to slit a sheet of metal between them in lines at intervals and the third set formed into series of annular ridges and hollows arranged together with open spaces between every two ridges and adapted to ridge and depress a sheet of metal between them, expand the slits laterally and corrugate the sheet with the ridges therein allowed for wholly by the lateral expansion of the slits, the three sets of rolls connected together by suitable gearing to operate in unison and with suitable appliances for power—the whole machine constructed, arranged and combined essentially as set forth.

GEO. HAYES.

Witnesses:
ARTHUR HAYES,
R. H. REILLS.